(12) United States Patent
Laun

(10) Patent No.: US 7,111,509 B2
(45) Date of Patent: Sep. 26, 2006

(54) METHOD AND DEVICE FOR DETERMINING AN EXPECTANCY RANGE FOR A FILLING LEVEL ECHO AND A FALSE ECHO

(75) Inventor: Robert Laun, Hausach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 10/622,838

(22) Filed: Jul. 18, 2003

(65) Prior Publication Data
US 2004/0257269 A1 Dec. 23, 2004

Related U.S. Application Data

(60) Provisional application No. 60/397,590, filed on Jul. 19, 2002.

(51) Int. Cl.
G01F 23/28 (2006.01)
(52) U.S. Cl. .................... 73/290 V; 73/290 R
(58) Field of Classification Search .............. 73/290 R, 73/290 V
See application file for complete search history.

(56) References Cited

U.S. PATENT DOCUMENTS

| | | | |
|---|---|---|---|
| 4,596,144 A | 6/1986 | Panton et al. | |
| 5,157,639 A | 10/1992 | Leszczynski | |
| 5,587,969 A | 12/1996 | Kroemer | 367/99 |
| 5,614,911 A | 3/1997 | Otto et al. | |
| 6,046,960 A * | 4/2000 | Kumar | 367/87 |
| 6,237,410 B1 | 5/2001 | Dyck et al. | |
| 6,298,008 B1 | 10/2001 | Lyon et al. | |

FOREIGN PATENT DOCUMENTS

| | | |
|---|---|---|
| DE | 4223346 | 1/1994 |
| DE | 4232300 | 4/1994 |
| DE | 4407369 | 9/1995 |
| EP | 0 689 679 | 3/1993 |
| EP | 0644404 A1 | 3/1995 |

OTHER PUBLICATIONS

"Stand der Technik in der Signalverarbeitung (Echofox)", with German and , English Abstracts.

Devine, Peter , "Radar level measurement : the user's guide", Burgess Hill : Vega Controls, ISBN: 095389200X,(2000),47-75.

(Continued)

Primary Examiner—Hezron Williams
Assistant Examiner—Rodney Frank
(74) Attorney, Agent, or Firm—Schwegman, Lundberg, Woessner & Kluth P.A.

(57) ABSTRACT

The invention relates to a method of determining expectancy ranges to which echoes from a filling level envelope curve are assigned, which curve has been generated by a filling level measurement device. The determination of these expectancy ranges takes place in consideration of the temporal behavior of past echo data. Since these expectancy ranges exhibit a predeterminable range width, a statement can be made with a predeterminable probability whether an echo—be it at filling level echo or a false echo—assigned to such a range, has been assigned erroneously to this range. When, for example, an expectancy range for a filling level echo has been prognosticated, then it may be assumed with a predeterminable probability that an echo falling within this expectancy range, actually is a filling level echo. The invention moreover relates to an evaluation means configured for carrying out this method and a level gauge. Furthermore, the present invention relates to a computer program and a computer program product including instructions for carrying out the method according to the invention.

26 Claims, 10 Drawing Sheets

OTHER PUBLICATIONS

Skolnik, Merrill I., "Introduction to radar systems", *New York : McGraw-Hill,* 2nd Edition, ISBN: 0070579091,(1980).

"International Search Report, Application No. PCT/EP 03/07779, date mailed May 1, 2004", 6 Pages.

* cited by examiner

| curve number 543 11.07.2002 14:11:10 | curve number 544 11.07.2002 14:11:25 | curve number 545 11.07.2002 14:11:41 | curve number 546 11.07.2002 14:11:55 | curve number 547 11.07.2002 14:12:11 | curve number 548 11.07.2002 14:12:25 | curve number 549 11.07.2002 14:12:40 | curve number 550 11.07.2002 14:12:55 | curve number 551 11.07.2002 14:13:09 | curve number 552 11.07.2002 14:13:24 |
|---|---|---|---|---|---|---|---|---|---|
| 68 | 68 | 65 | 65 | 64 | 62 | 60 | 62 | 62 | 62 |
| 67 | 67 | 65 | 65 | 63 | 61 | 58 | 62 | 62 | 62 |
| 66 | 67 | 65 | 64 | 62 | 60 | 57 | 61 | 61 | 60 |
| 65 | 65 | 64 | 63 | 61 | 58 | 56 | 59 | 59 | 58 |
| 64 | 64 | 63 | 62 | 60 | 58 | 54 | 58 | 57 | 57 |
| 62 | 62 | 62 | 61 | 58 | 57 | 54 | 57 | 56 | 56 |
| 61 | 61 | 60 | 59 | 57 | 56 | 55 | 56 | 57 | 60 |
| 60 | 60 | 59 | 58 | 57 | 56 | 57 | 60 | 65 | 70 |
| 59 | 59 | 59 | 57 | 57 | 58 | 65 | 69 | 74 | 78 |
| 59 | 59 | 58 | 58 | 63 | 67 | 73 | 77 | 80 | 83 |
| 58 | 58 | 58 | 65 | 71 | 75 | 79 | 82 | 85 | 86 |
| 58 | 64 | 66 | 73 | 77 | 81 | 84 | 85 | 86 | 87 |
| 62 | 72 | 74 | 79 | 82 | 85 | 86 | 87 | 86 | 87 |
| 70 | 78 | 80 | 84 | 85 | 86 | 86 | 86 | 86 | 86 |
| 77 | 82 | 84 | 85 | 85 | 86 | 86 | 86 | 85 | 85 |
| 82 | 84 | 85 | 85 | 85 | 85 | 85 | 85 | 84 | 83 |
| 84 | 85 | 85 | 85 | 85 | 85 | 84 | 84 | 82 | 81 |
| 84 | 84 | 84 | 83 | 83 | 83 | 83 | 82 | 79 | 78 |
| 83 | 83 | 83 | 81 | 82 | 82 | 82 | 81 | 77 | 75 |
| 82 | 82 | 82 | 80 | 81 | 82 | 81 | 80 | 76 | 73 |
| 82 | 82 | 81 | 80 | 81 | 81 | 81 | 79 | 75 | 71 |
| 82 | 81 | 81 | 80 | 81 | 81 | 80 | 79 | 74 | 70 |
| 82 | 81 | 81 | 81 | 81 | 81 | 80 | 78 | 72 | 69 |
| 82 | 81 | 81 | 81 | 81 | 80 | 78 | 77 | 71 | 68 |
| 82 | 81 | 81 | 81 | 80 | 79 | 77 | 76 | 71 | 68 |
| 81 | 80 | 80 | 79 | 79 | 78 | 77 | 75 | 71 | 71 |
|   |   |   |   |   |   |   |   | 72 | 72 |

Fig. 5

| time → | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 9 | 9 |
| 0 | 0 | 0 | 0 | 0 | 0 | 0 | 0 | 16 | 16 |
| 0 | 0 | 0 | 0 | 0 | 0 | 0 | 9 | 21 | 21 |
| 0 | 0 | 0 | 0 | 0 | 0 | 9 | 16 | 24 | 24 |
| 0 | 0 | 0 | 0 | 0 | 0 | 16 | 21 | 25 | 25 |
| 0 | 0 | 0 | 0 | 9 | 9 | 21 | 24 | 24 | 24 |
| 0 | 0 | 9 | 9 | 16 | 16 | 24 | 25 | 21 | 21 |
| 0 | 0 | 16 | 16 | 21 | 21 | 25 | 24 | 16 | 16 |
| 0 | 9 | 21 | 21 | 24 | 24 | 24 | 21 | 9 | 9 |
| 9 | 16 | 24 | 24 | 25 | 25 | 21 | 16 | 0 | 0 |
| 16 | 21 | 25 | 25 | 24 | 24 | 16 | 9 | 0 | 0 |
| 21 | 24 | 24 | 24 | 21 | 21 | 9 | 0 | 0 | 0 |
| 24 | 25 | 21 | 21 | 16 | 16 | 0 | 0 | 0 | 0 |
| 25 | 24 | 16 | 16 | 9 | 9 | 0 | 0 | 0 | 0 |
| 24 | 21 | 9 | 9 | 0 | 0 | 0 | 0 | 0 | 0 |
| 21 | 16 | 0 | 0 | 0 | 0 | 0 | 0 | 0 | 0 |
| 16 | 9 | 0 | 0 | 0 | 0 | 0 | 0 | 0 | 0 |
| 9 | 0 | 0 | 0 | 0 | 0 | 0 | 0 | 0 | 0 |

↓ location

Fig. 7

| time → | | | | | | | | | |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 25 |
| 0 | 0 | 0 | 0 | 0 | 0 | 0 | 25 | 25 | 0 |
| 0 | 0 | 0 | 0 | 0 | 0 | 0 | 0 | 0 | 0 |
| 0 | 0 | 0 | 0 | 0 | 0 | 25 | 0 | 0 | 0 |
| 0 | 0 | 0 | 0 | 0 | 25 | 0 | 0 | 0 | 0 |
| 0 | 0 | 0 | 0 | 0 | 0 | 0 | 0 | 0 | 0 |
| 0 | 0 | 0 | 25 | 25 | 0 | 0 | 0 | 0 | 0 |
| 0 | 25 | 25 | 0 | 0 | 0 | 0 | 0 | 0 | 0 |
| 0 | 0 | 0 | 0 | 0 | 0 | 0 | 0 | 0 | 0 |
| 25 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |

↓ location

|   |   |   |   |   |   |   |   |
|---|---|---|---|---|---|---|---|
| 65 | 64 |   |   |   |   |   |   |
|   |   | 63 |   | 66 |   |   |   |
|   |   |   | 68 |   | 64 |   | 63 |
|   |   |   |   |   |   | 62 |   |
|   |   |   |   |   |   |   |   |
| 33 |   | 40 |   | 22 | 31 | 32 |   |
|   | 20 |   | 33 |   |   |   | 30 |

Fig. 10

|   |   |   |   |   |   |   |   |
|---|---|---|---|---|---|---|---|
| 1 | 1 |   |   |   |   |   |   |
|   |   | 1 |   | 1 |   |   |   |
|   |   |   | 1 |   | 1 |   | 1 |
|   |   |   |   |   |   | 1 |   |
|   |   |   |   |   |   |   |   |
| 2 |   | 2 |   | 2 | 2 | 2 |   |
|   | 2 |   | 2 |   |   |   | 2 |

METHOD AND DEVICE FOR DETERMINING AN EXPECTANCY RANGE FOR A FILLING LEVEL ECHO AND A FALSE ECHO

PRIORITY CLAIM

This application claims the benefit of U.S. Provisional Patent Application Ser. No. 60/397,590 filed on Jul. 19, 2002 which is expressly incorporated herein, in its entirety, by reference.

TECHNICAL FIELD

The present invention generally relates to a method of improving the identification of filling level echoes and false echoes in a filling level envelope curve used for determining, e.g. in filling level metrology, the current filling level with a filling level measuring device. The invention particularly relates to a method that prognosticates, using certain mathematical algorithms considering the sum of echoes received by the filling level measuring device in a past time window, which sum of echoes is normally referred to as an echo envelope curve or filling level envelope curve, for certain future time window expectancy ranges in which future filling level echoes or false echoes may be expected.

The invention moreover relates to an evaluation means for executing the described method, in particular for analyzing filling level envelope curves received in the past, and for prognosticating expectancy ranges for echoes to be expected in the future. Here, ultrasonic or radar filling level measuring devices working on the pulse echo principle are of particular interest.

The invention moreover relates to a computer program for performing the method according to the invention in a filling level measuring device or an evaluation means according to the invention, as well as to a corresponding computer program product. Under such a computer program product, any desired computer-readable medium may be understood, such as a CD-ROM, a floppy disk or a removable hard disk, but also a computer program that may be loaded from a server.

Within the scope of the present invention, the range around a local maximum in a filling level envelope curve may generally be understood as an echo, which range exceeds a freely selectable threshold value. As echo data may be understood the data produced by an analog-to-digital converter by sampling the filling level envelope curve, which data includes, for instance, the dimensions location, time and amplitude representing the filling level envelope curve at discrete times.

Filling level measuring devices working on the pulse echo principle, which sample a reflected echo signal, produce from the sampled echo signal a series of information to each echo present in the filling level envelope curve. The generation of an envelope curve from received echo signals is well known, and therefore, this technology does not require further explanations (cf. e.g.: DE 44 07 369 C2; M. Skolnik, "Introduction to Radar Systems", $2^{nd}$ edition, 1980, McGraw.Hill; title: Peter Devine, "Radar level measurement—the users' guide", VEGA Controlls Ltd., 2000, ISBN 0-9538920-0-X).

BACKGROUND OF THE INVENTION

In radar or ultrasonic filling level sensors working on the pulse echo principle, the filling level is determined from a certain echo that can be detected in the filling level envelope curve as representing the filling level. Thereby, the filling level envelope curve comprised of individual echoes is sampled by an analog-to-digital converter whereby the received filling level envelope curve is made available to a microprocessor or microcontroller for further processing. The received filling level envelope curve, however, does not only include the filling level echo that is representative of the current filling level, but often also includes unwanted or false echoes that are, for example, caused by multiple reflections or by reflections on parts mounted in the vessel.

In order to identify only the actual filling level echo in such a filling level envelope curve and to filter out the unwanted reflections, a pre-processing of the filling level envelope curve becomes necessary. During this pre-processing of the filling level envelope curve, the echoes are processed with the support of image processing methods such as filtering, averaging, edge recognition, selection and classification. The filling level envelope curve thus processed is subsequently examined and analyzed for echoes that are representative of the filling material, and for unwanted echoes. By means of the echoes thus processed, that, for example, include data such as location, amplitude and width of the echoes, a decision may then be made, which echo is representative of the current filling level and which is not. When an echo is detected as being representative of the current filling level, then the location of the analyzed echo corresponds to the searched filling level value.

Since a received filling level envelope curve may always include false echoes, as has already been explained, these must be safely recognized so as to prevent an erroneous filling level being determined from such an unwanted echo. A known criterion for assessing whether an echo is a filling level echo or an unwanted echo, consists in using always that echo as a filling level echo that has the largest amplitude. This criterion, however, must be judged uncertain, since an interfering object that is present in the signal propagation path and is closer to the receiver of the filling level measuring device than the current filling level, as a rule, will produce a higher echo than the filling level itself. Consequently, this criterion should never be applied alone but always and only in combination with further conditions.

From DE 42 23 346 A1, for example, an arrangement and a method is known for a contact-free distance measurement by means of pulse echo signals. For a more precise determination of signal transit times, this arrangement compares a pulse echo signal to signal patterns stored in a neuronal network. The signal transit time is supposed to be even then exactly determined when the pulse echo signal is considerably superposed by interfering echo signals. By means of parallel data processing techniques and the associative comparison of the received signal to acquired patterns that are stored in the neuronal network, it is by far better possible than it has been up to date to regenerate the hidden information and to determine with this very correct filling level data. The application of the neuronal-associative signal processing enables a complex holistic evaluation of the pulse-echo profile. Hereby, the measurement distance itself may be used as an intrinsic reference element, in that compensation magnitudes are derived from existing unwanted echoes.

From DE 42 34 300 A1, a filling level measuring method is known, in which the temporal shift of the useful echo caused by a changing signal transit time occurring during vessel filling or emptying processes is detected, and this criterion is evaluated so as to be able to distinguish the useful echo from unwanted echoes. Here, for distinguishing a useful echo from an unwanted echo, it is hence checked whether echo pulses exhibiting a continuous time shift are contained in subsequent signal progressions. Upon detection of such echo pulses, these are classified as being useful echoes. The basic idea of the procedure known from this consists in that signal transit times, upon reflection on the inner vessel walls, are stable with respect to time, so that the position of such interfering pulses is invariable even in repeated measurements within the received instruction. This time position stability within the reception profile normally also applies to the useful echo directly reflected from the filling material surface.

Other methods for filling level echo recognition refer to echo ratios received in the past, and compare these one by one to the echoes of the currently received filling level envelope curve. In these methods, the received echoes of an already received filling level envelope curve are stored in a memory so as to be able to compare them subsequently and individually to the data from a next filling level envelope curve. From EP 0 689 679 B1, a method is known that correlates currently received echoes with echoes already received in the past according to a difference value formation, and calculates from this, using a fuzzy evaluation unit, a probability for this echo to be a filling level echo. The problem of this procedure is, on the one hand, that this method is only suited for filtering out multiple echoes. After all and in addition, this method disclosed in EP 0 689 679 B1 only enables a comparison between echoes at two times. Observing the tendency of the filling level echo and forecasting the tendency, as well as an assignment to tendency ranges is not possible.

A further problem consists in that in a comparison between the newly received echoes and the echoes of already stored filling level envelope curves, assignment problems often arise, since the currently received echoes can change with time, although they are in each case always reflected by the same filling level surface as a reflector. Problems of this kind arise, for example, due to the formation of dust during the filling process or an after-slipping of filling material during emptying processes of bulk good vessels.

In order to ensure a safe filling level measurement, however, it is necessary that a filling level once recognized, is repeatedly recognized by means of currently received echoes, and that, for example, an interfering reflection is not erroneously evaluated as being representative of the filling level. If, for example, a filling level echo cannot be detected temporarily, this must be recognized so that an assignment is not made in which, for example, a false echo is identified as the filling level echo. This often problematic assignment of echoes from past filling level envelope curves to data of a current filling level envelope curve takes place in that, as has already been described, data of current echoes is compared to data of already received echoes. If in such a comparison, e.g. by means of a threshold value curve or a maximum search, a current echo corresponds to an already received echo, then it is assumed that these echoes correspond to each other, whereby the new echo is identified as a true echo. If the number of the echoes contained in an already received filling level envelope curve distinguishes with respect to the number of current echoes, then there exists the risk of assignment errors occurring. Likewise, there exists the risk of misassignment when several echoes arise in a narrow range.

SUMMARY OF THE INVENTION

The technical problem on which the present invention is based consists in providing a method by means of which the assignment problems described may be reduced, and thus, in particular, a safer detection and measurement of filling levels especially during a filling or emptying process may be ensured. In particular, a possibility is intended to be provided enabling a radar or ultrasonic filling level measurement device working on the pulse echo principle to recognize an echo once recognized as such—be it a filling level echo or a false echo—also in future filling level envelope curves with a predetermined probability.

According to a first aspect of the invention, this technical problem is solved by a method for determining at least one expectancy range for a filling level echo or a false echo generated by an ultrasonic or radar filling level measurement device, with the at least one expectancy range being determined in consideration of the temporal behavior of at least two past filling level echoes or false echoes. Such a method may, for example, comprise the following steps:

identifying at least one first filling level echo or false echo from a first filling level envelope curve, the first filling level envelope curve having been generated at a first time;

identifying at least one second filling level echo or false echo from a second filling level envelope curve, the second filling level envelope curve having been generated at a second time different from the first time;

determining an expectancy range for a filling level echo or false echo in consideration of the temporal behavior of the identified at least one first filling level echo or false echo and of the identified at least second filling level echo or false echo.

According to another aspect, the problem on which the invention is based is solved by a filling level measurement device including an evaluation unit for determining at least one expectancy range for a filling level echo or a false echo generated by a filling level measurement device, the at least one expectancy range being determined in consideration of the temporal behavior of at least two past filling level echoes or false echoes.

According to a third aspect, the problem on which the invention is based is likewise solved by an evaluation unit for determining at least one expectancy range for a filling level echo or a false echo generated by a filling level measurement device, the at least one expectancy range being determined in consideration of the temporal behavior of at least two past filling level echoes or false echoes.

Furthermore, a computer program, as well as a corresponding computer program product for determining at least one expectancy range for a filling level echo or a false echo generated by an ultrasonic or radar filling level measurement device, solves the problem on which the invention is based in that the computer program includes instructions by means of which at least one expectancy range can be determined in consideration of the temporal behavior of at least two past filling level echoes or false echoes.

The invention is, for example, based on the idea of referring for the first time to mathematical algorithms during echo processing, in such a manner that in consideration of filling level envelope curves and the echoes thereof already received in the past, statements can be made on the echoes of a filling level envelope curve to be expected in the future during a filling or emptying process. By such a procedure, it is, for example, for the first time possible to make a statement with a predetermined probability whether an echo within a currently received filling level envelope curve, is a filling level echo or a false echo.

The starting point of the present method is, for example, a filling level envelope curve sampled by analog-to-digital conversion. According to this first process step, the received filling level envelope curve is available in a digitized form, e.g. including the dimensions location, time and amplitude, for being processed by a microprocessor or a microcontroller. After this analog-to-digital conversion, the amplitudes of the filling level envelope curve echoes are stored depending on location and time in a two-dimensional array or in a matrix. In the case of the three detected dimensions location s, amplitude A and time t, a certain amplitude A is assigned to each time t and each location s, i.e. A(t,s). When one or more further dimensions are detected through the detected echo, such as, for example, a pressure or a further characteristic physical parameter, the echo data accordingly is stored in a four-dimensional or multidimensional array or in a tensor. Starting from an echo having the dimensions location, amplitude, time and, for example, pressure, this would mean that each time t and each location s have assigned a certain amplitude A and a certain pressure p:

$$t,s \rightarrow A,p$$

The size of the array into which the echo data is written in this method, here is variable according to one embodiment of the present invention, and may be dynamically adapted by this method to various parameters such as filling velocity or time window size. The size of the time window thereby corresponds to the time in which past filling level envelope curves are intended to be taken into account for the forecast of future echoes.

Now, the further method will be explained below by means of the dimensions location, amplitude and time detected in an echo, whereby, as has already been explained, the method according to the invention can also be analogously applied to a fourth and further dimension/s.

In this method, each filling level envelope curve recorded by a filling level measurement device at equidistant intervals of time, is written in the array in columns and lines, depending on time and location. Each filling level envelope curve hereby corresponds to one line or column. Thus, the amplitudes of the filling level envelope curves are written in the arrays column-wise or line-wise depending on location and time, until the array, that has a predetermined size, is filled with echoes of filling level envelope curves.

Instead of writing each filling level curve recorded by a filling level measurement device in the array, it is likewise possible to include only each second, third or quite generally, only each $n^{th}$ filling level envelope curve in the array, whereby applies n∈ℕ*. This turns out to be very advantageous, especially with very slow level changes, since memory and computer capacities may be saved in the method according to the invention.

When a filling level changes during a filling or emptying process of a vessel, then the dimensions of the location of the received echo will inevitably change at the same time, which dimensions in turn are a function of the echo signal transit time. This means that in the location-time plane of the array, in which the filling level envelope curves or the echoes are stored with their echo data, the location of the echo amplitudes will change with time. When this correlation is analyzed in more detail, then it may be noted in a continuous filling or emptying process of a vessel having a constant cross-section over the vessel height, that this correlation is linear. When the cross-sectional surface of the vessel, on the other hand, is not constant over the height, then other mathematical correlations will result, which, however, can also be described with mathematical functions. But when the time windows are selected so as to be sufficiently small-sized, and the echo pulses for generating the filling level envelope curves are in addition present in sufficiently small time intervals, then in a first and sufficiently precise approximation, straight linear lines will result for the progression of the filling level, about which the actually identified echoes, however, will slightly scatter.

Once the array is filled with filling level envelope curves received in the past or with the corresponding echoes, the expectancy ranges can be determined in which filling level echoes or false echoes may be expected in a next time window. For this purpose, the array is checked for existing correlations of the received echoes between location and time by means of various methods for image processing based on mathematical algorithms such as filtering, averaging or selection. With the help of these methods, the maximum values of each echo present in each filling level envelope curve, are determined in each filling level envelope curve. In a further step, these maximum values, using an edge identification algorithm, serve the purpose of detecting the chronological progression of each echo in chronologically successive filling level envelope curves. With the use of such an edge identification algorithm, "edges" may, for example, be recognized in a visualized representation of the array revealing the change with time of each echo.

In such a visualized array representation in which the echo amplitudes are registered in the array depending on their location and the respective time, this means that associated lines will crystallize out for each echo in the array. If an echo in the array does not change with time or only slightly, i.e. the gradient of the respective line is about zero, then this will be either a false echo reflected by a stationary vessel component, or it will be a filling level echo, yet, with the filling level not changing. When a line, on the other hand, exhibits a positive or negative gradient, then it may be assumed that this line corresponds to the filling level or that this line corresponds to multiple filling level echoes. These multiple echoes are generated in that a pulse, prior to being received again by the filling level measurement device, possibly is reflected several times between the filling level surface and the vessel cover, whereby these multiple echoes have a longer transit time and erroneously fake a low filling level.

Since only the straight line representing the true level is of interest for further processing, the straight lines of the multiple echoes must be filtered out. This takes place, for example, in a further process step, in which these straight lines are selected out by means of fuzzy logic searches, e.g. using the method described in EP 0 689 679 B1. After this selection, the array only comprises just the trace of the straight line that is representative of the filling level. Such a filtering of multiple echoes, however, is not imperative, since the method according to the invention enables an assignment of the multiple echoes to be expected in the future to corresponding prognosticated expectancy ranges so that a misassignment cannot take place. In addition, multiple echoes have a quantitatively higher gradient than the filling level echo.

So as to be able to draw conclusions concerning the echoes to be expected in the future, the already received echoes present in the past time window, which are stored in the array, must be evaluated in a manner that conclusions may be drawn from this to the echoes to be expected in the future. Since it may be assumed that future echoes orientate themselves by the behavior of past echoes, this is done in that expectancy ranges at the end of the straight line found in the array are determined, in which filling level echoes or false echoes may be expected in the future.

This outlook on the future time window may be enabled using certain mathematical approximation methods and algorithms such as regression analysis. When assuming linear ratios during this prognosis, as has already been mentioned, then the problem definition is reduced to a linear regression. Instead of linear regression, however, any other mathematical approximation method such as a polynomial interpolation method or a spline interpolation method may be applied. In order to prognosticate the expectancy ranges in a future time window, these or similar methods are used to determine the chronological progression of the straight line so as it presumably would continue in the future time window when the conditions remain unchanged. About these straight lines thus prognosticated, the filling level echoes or the false echoes presumably would scatter when the filling level conditions remain unchanged. For being able to make a quantitative statement whether an echo scattering in the future about a prognosticated straight line actually may be ascribed to this straight line or to the associated echo known from the past, a deviation measure is calculated in a further process step, such as, for example, the standard deviation of the echoes stored in the current array relative to the determined compensating line. A multiple of the deviation measure thus calculated may then be used for determining the scattering range about the straight line in the future time window, in that echoes falling into that range with a predeterminable expectancy may actually be assigned to the expectancy range thus generated.

The expectancy ranges thus calculated lie in the future, seen from the currently evaluated array, and define ranges in which echoes in a future time window may be ascribed with a predeterminable probability to a certain echo identified in the past. In that the standard deviation or a multiple of the standard deviation is used as the width of the echo range, it may be assumed with a predeterminable probability that the echoes coming to reside within an expectancy range thus defined, actually correspond to the echoes identified as filling level echoes or false echoes in the past.

Of course, any other width may be assumed as the scattering range about a prognosticated straight line, in this case, however, conclusions may no longer be drawn as to the probability with which an echo coming to reside within an expectancy range, actually may or may not be assigned to same.

The method according to the invention described so far aims at not carrying out the expectancy range determination anew with each newly recorded filling level envelope curve but to carry out the expectancy range determination only then anew when the array has been filled again with the future filling level envelope curves, i.e. or the corresponding echo data.

A further exemplary embodiment of the method according to the present invention provides the determination of a new expectancy range after each newly recorded filling level envelope curve. Alternatively, it is also possible to determine a new expectancy range after each $n^{th}$ (n∈N*) newly registered filling level envelope curve. For this purpose, it is necessary that the filling level envelope curves are restored in the array in that the "eldest" filling level envelope curves are erased, the remaining filling level envelope curves are shifted by n columns, and in the columns thus emptied, the newly recorded n filling level envelope curves are written. This embodiment is to be judged as being particularly advantageous, since the most recent filling level progression may be taken into account very precisely in the expectancy range determination.

In total, the present invention may turn out as being particularly advantageous in that a single comparison of the currently received echoes and the echoes already received in the past is no longer carried out by the method according to the invention, but the currently received echoes are assigned to a certain expectancy range in which echoes to be expected in the future may be presumed with a predetermined probability. Hereby, erroneous measurement results may by precluded to a high degree.

Another advantage of the invention may consist in that it is not only possible to define with the method described expectancy ranges in which filling level echoes may be expected, rather it is likewise possible to define expectancy ranges in which false echoes are to be expected with a certain probability. In order to identify a false echo as such with the highest possible certainty, apart from the criterion that false echoes are present in straight horizontal lines, a further criterion is available, that is that certain false echoes can only be expected in certain ranges.

When echoes arising in a future time window could be assigned to the expectancy range for the filling level echo, then the current filling level is determined using these echoes. Echoes, on the other hand, which cannot be assigned to any of the expectancy ranges for the filling level or a false echo, are rejected, and hence are not included in the prognosis for expectancy ranges lying further in the further. If the filling level rises or falls faster in the future time window than in the current time window, then the change of the filling velocity will be adapted by adapting the gradient of the next expectancy range so that the current changes are always taken into account by the present method.

As has already been described, the echoes are stored in a two-dimensional array or a matrix with their dimensions location, amplitude and time. In the consideration made thus far, however, the analysis of the echoes in principle was only reduced to the dimensions location and time. Since each location and each time, however, has assigned a certain echo amplitude, a further classification of the echo may be carried out on the basis of their amplitudes. In a graphic representation, this would mean that the visualized graphic progressions of the filling level echo would assume a certain position within a three-dimensional coordinate system, so that each echo would be assigned at a certain time and a certain location an amplitude to be expected.

Since each amplitude is represented by a certain value, it is possible to visualize the echoes in the plane as straight lines, with the amplitudes associated to a certain time and a certain location being represented by a color or gray scale value determined by the amplitude value.

A corresponding filling level measurement device, as well as a separate evaluation means for determining expectancy ranges in future time windows that can be assigned future echoes, comprises an evaluation unit including a memory, in which a predeterminable number of filling level envelope curves with the dimensions location, time and amplitude are stored in a two-dimensional array or a matrix. Furthermore, the evaluation unit of the filling level measurement device or of the evaluation means comprises a signal processing unit that by means of certain mathematical algorithms, such as, for example, regression analysis or polynomial interpolation, determines the progressions of the straight lines of the echoes stored in the array. The signal processing unit moreover serves the purpose of determining a deviation measure of the respective echoes from the calculated approximation lines, from which the width of the expectancy ranges is determined for the future time window which result about the prognosticated approximation line.

A corresponding computer program for determining expectancy ranges of future filling level echoes carries out the method according to the invention, and may, for example, be implemented in an evaluation program for evaluating generated envelope curves as a subroutine. Such evaluation programs are, for example, known as the trademark "Echofox®" of the company VEGA Grieshaber KG, Germany.

The method of the invention and the correspondingly operating computer program accordingly may be implemented in a separate evaluation means or, if desired, may be directly integrated in a filling level measurement device. Filling level measurement devices of the kind of interest here, incidentally are all known filling level measurement devices that sample a reflected echo signal, i.e., that generate a filling level envelope curve. Such filling level measurement devices are, for example, ultrasonic filling level measurement devices or radar filling level measurement devices, in particular so-called pulse radar filling level measurement devices.

BRIEF DESCRIPTION OF THE DRAWINGS

For the further explanation and the better understanding, one embodiment of the invention is described in more detail in the following with reference to the attached drawings. Therein show:

FIG. 5 an extract of an array with stored filling level envelope curve data;

FIG. 7 an array with filling level envelope curves stored therein;

FIG. 8 the array of FIG. 7 to which various image processing methods have been applied;

FIG. 9 an array with echo amplitudes stored therein;

FIG. 10 the array of FIG. 9 after an edge identification;

In all drawings, like means and units are designated with identical reference numerals.

DESCRIPTION OF A PREFERRED EMBODIMENT OF THE INVENTION

Figure 1:
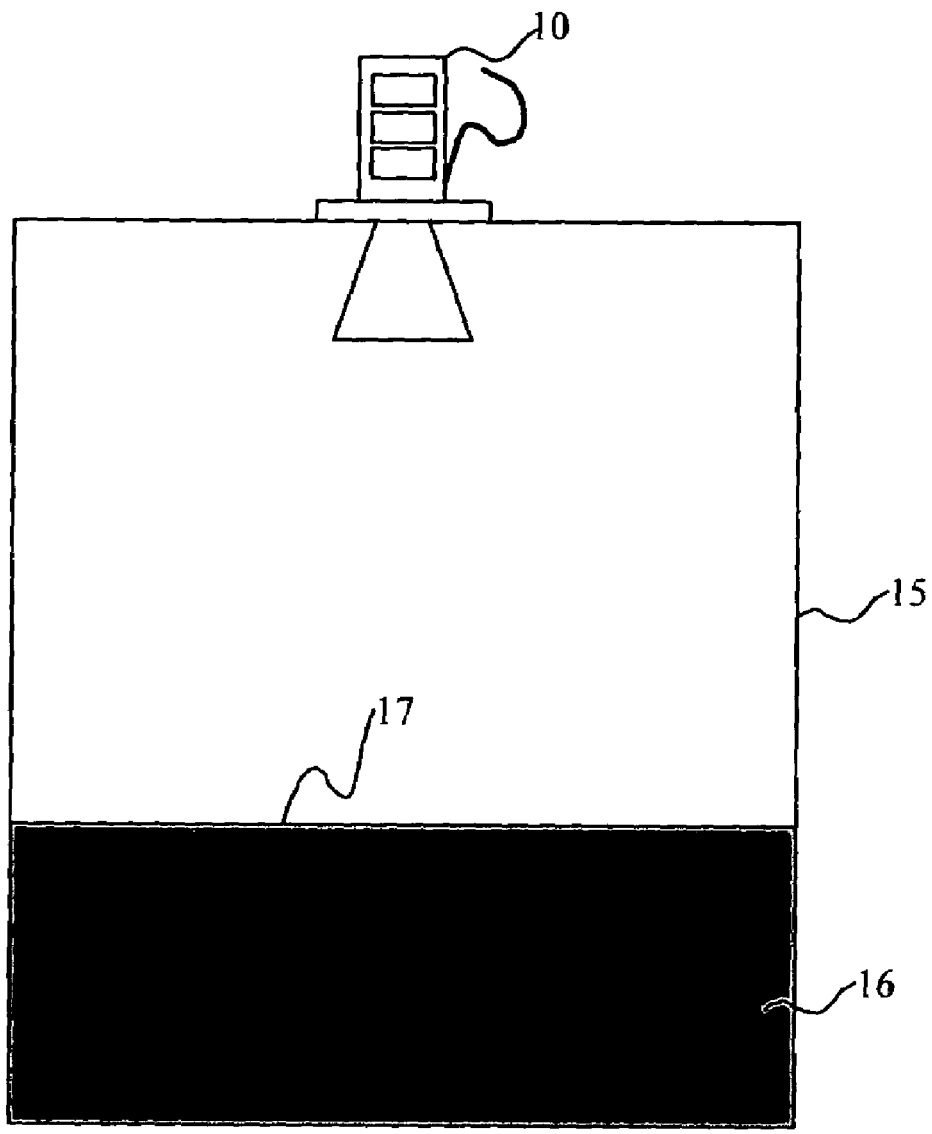
FIG. 1 a schematic side view of a filling level measurement device installed in the cover area of a vessel.

From the schematic representation according to FIG. 1, it can be seen that a filling level measurement device 10 is mounted in the cover area of a vessel 15. Inside the vessel 15, there is a bulk or liquid filling material 16, forming a filling material surface 17.

The filling level measurement device 1 mounted in vessel 15 comprises a housing 12 and an antenna 13. Via a cable 14, in particular a so-called 4–20 mA two-wire loop, it is connected to a power supply and communications means not shown here.

Figure 2:
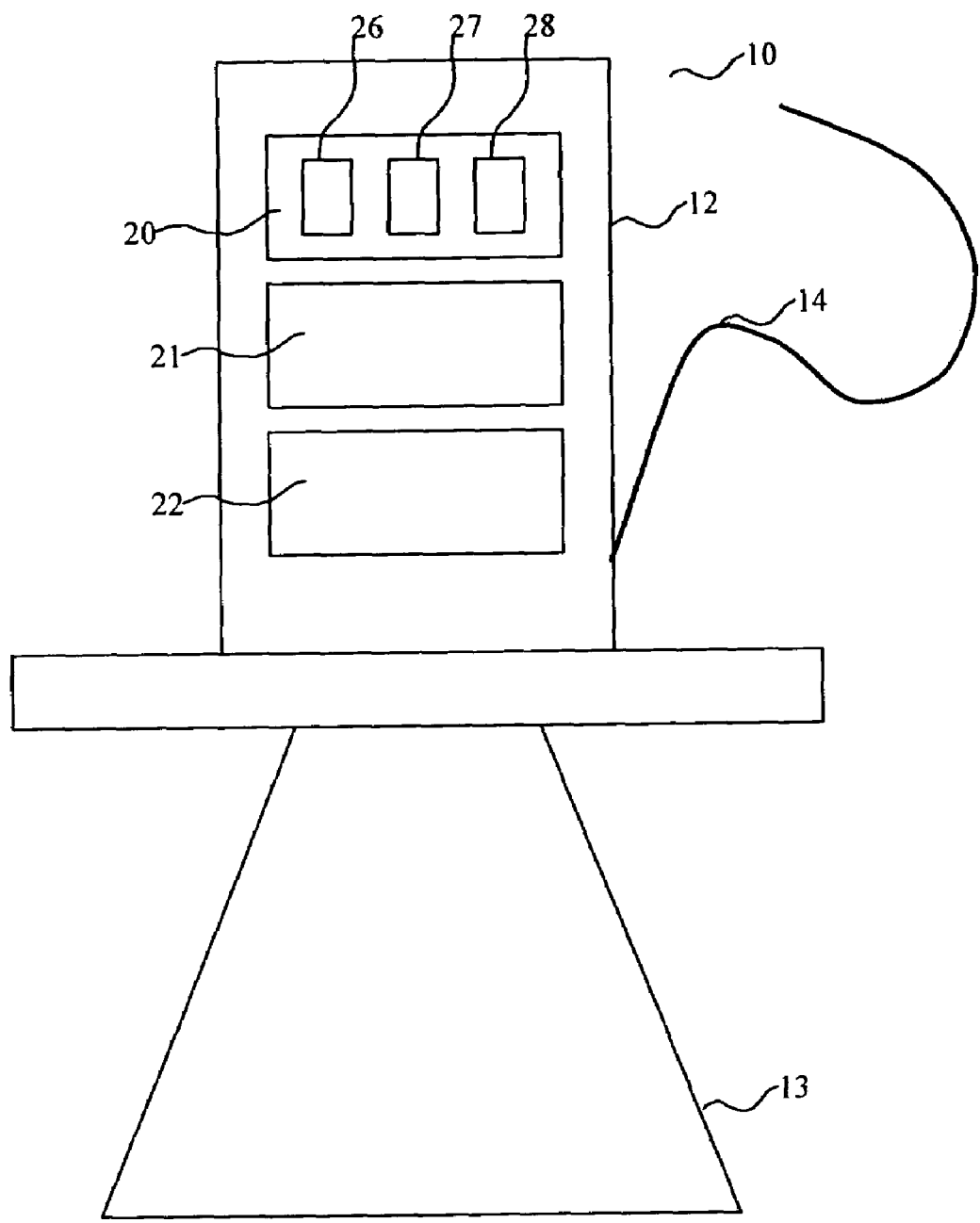
FIG. 2 a schematic side view of a filling level measurement device.

In the extremely schematic representation according to FIG. 2, the filling level measurement device 10 is illustrated including an evaluation unit 20, a transmitting unit 21 and a receiving unit 22. By means of the transmitting unit 21, short radar pulses or ultrasonic pulses are emitted towards the filling material surface 17 via the antenna 13. These signals are reflected on the filling material surface 17, and are received via the same antenna 13. These are further processed according to the state of the art in the receiving means 22, and are evaluated in the evaluation means 20. For this, a filling level envelope curve is formed in a known manner from the individual echo signals. This filling level envelope curve is then in turn closer examined in the evaluation unit 20 using mathematical methods. For this purpose, the evaluation unit 20 comprises a memory 26, an image processing unit 27, and a signal processing unit 28. Above all, the filling level envelope curve is rated and evaluated using the method according to the invention, in particular as it is described in the following.

Figure 3:
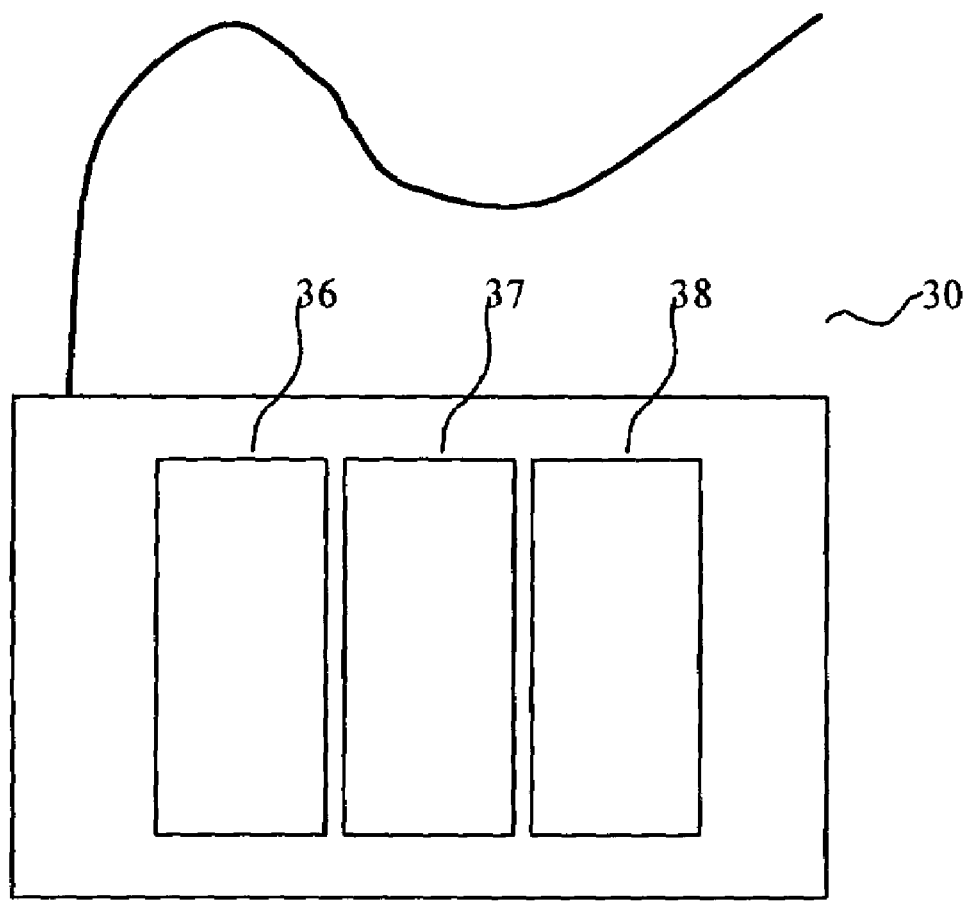
FIG. 3 a schematic side view of an evaluation means.

Instead of the evaluation of the signals in the evaluation unit 20 of the filling level measurement device 10, the evaluation may likewise ensue using the evaluation unit 30 shown in FIG. 3. FIG. 3 shows a schematic representation of an evaluation unit 30 rating and evaluating the signals received by the filling level measurement device 10 of FIG. 1 with application of the method according to the invention. For this purpose, the evaluation means 30 comprises a memory 36, an image processing unit 37, and a signal processing unit 38. In contrast to the filling level measurement device of FIG. 2, the evaluation means 30 may be located in another place than directly on the vessel, and is therefore suited for evaluating filling level envelope curves of several filling level measurement devices at the same time.

Figure 4:
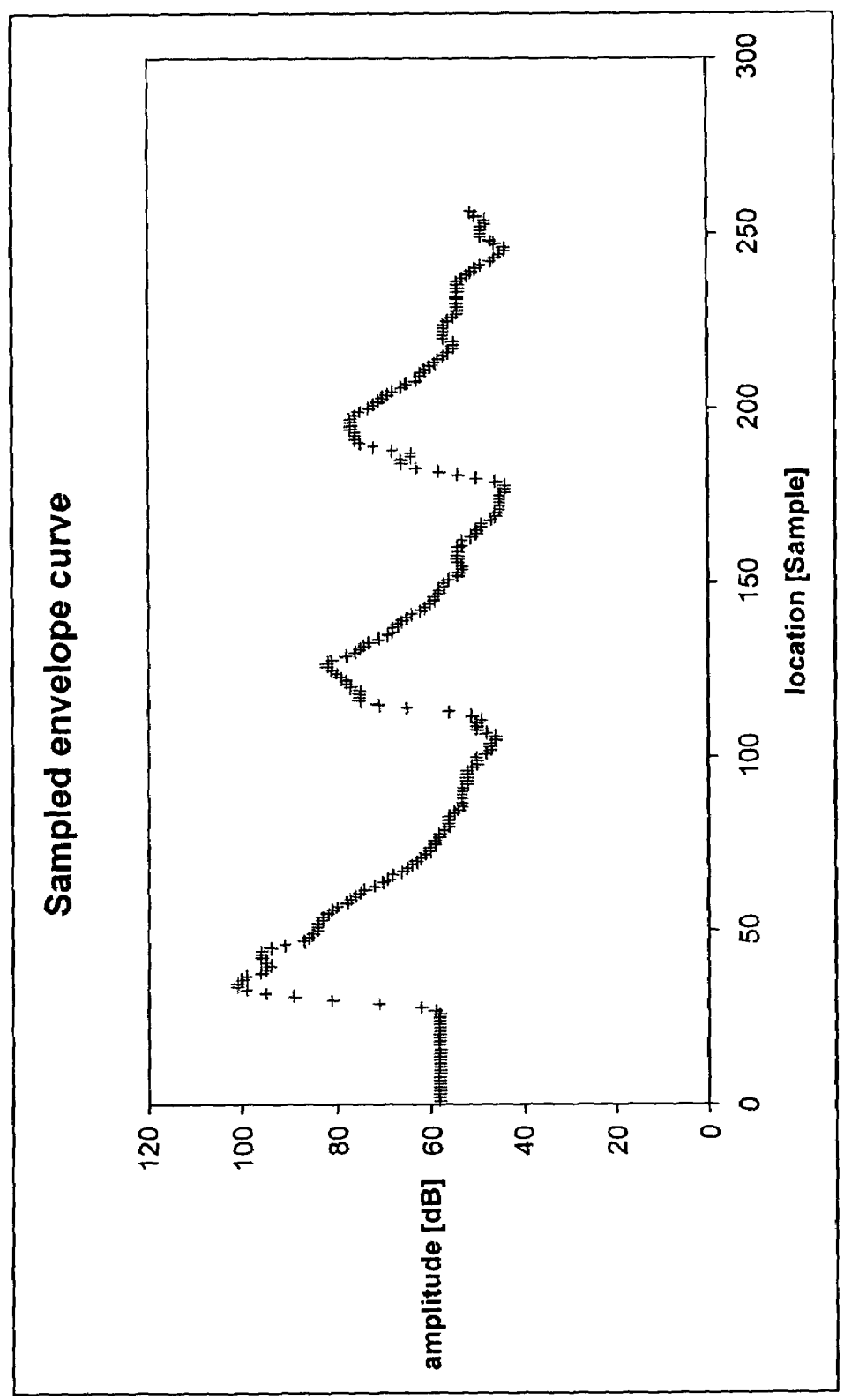
FIG. 4 a filling level envelope curve sampled by an analog-to-digital converter.

Filling level envelope curves sampled by an analog-to-digital converter serve as a basis for signal processing in filling level metrology. FIG. 4 shows a filling level envelope curve sampled in such a manner at constant intervals of time. As a whole, three echoes are present in the filling level envelope curve graphically shown in FIG. 4, whereby a mere observation of this filling level envelope curve does not allow the judgment which of the three echoes represents the actual filling level echo. In principle, each of the three echoes may represent either a filling level echo or a false echo or a multiple echo. However, when an echo is once identified as being a filling level echo or a false echo, then it is possible with the method according to the invention to predict for future echoes with a very high probability, whether an echo is a filling level echo or a false echo.

For this, a filling level envelope curve generated at equidistant intervals of time, such as, for example, illustrated in FIG. 4, is successively stored per columns or lines in a two-dimensional array or a matrix depending on location and time. With several recorded filling level envelope curves, an array develops including the dimensions location and time, as it is shown in FIG. 5. In the detail of an array illustrated in FIG. 5, the single columns represent the filling level envelope curves recorded at different times, and the lines represent the location of the individual echoes. In the array of FIG. 5, the echo amplitudes A are plotted in dependence of the time t (column) and the location s (line):

$$A(t,s).$$

The maximum column number of the array may be determined after one run of the present method, but may as well correspond to a fixed predefined value. The array is filled with newly recorded filling level envelope curves, until the maximum column number is reached. As soon as same is reached, the further process steps of the present method are initiated, by means of which the expectancy ranges are calculated for the next array or the next time window. The number of the column number in each array corresponds to a time window, in which the echo ratios can be traced back a certain time. The maximum number of lines results from the spacing of the single sampling points of the analog-to-digital converter and the maximum measurement range of the sensor. In the following, it will be briefly described how the number of columns may be determined within the framework of the method according to the invention. This procedure, however is not imperative, since good results can also be obtained in usual conditions with a column number fixed to a constant value.

However, when a dynamic determination of the maximum number of columns is desired, this will depend on the filling velocity and the time intervals between the individual filling level envelope curves (cycle time). Thereby, a compromise must be found that ponders between the size of the array and the function of the following algorithms. For example, when a filling velocity v of about 2.3 m/h is assumed and the progression of the last half meter (this value should in any case be larger than the width of an echo) is considered to be sufficient for tracking the filling level, then the array according to $$\Delta t = \frac{\Delta s}{\Delta v}$$

should comprise a time window of about 13 minutes.

The number of columns z now results from the time horizon (13 minutes) to be stored and the cycle time of the sensor. With a cycle time f of 1<sup>1</sup>/<sub>5</sub>, a number of columns z of 780[–] would result according to $$z = \Delta t \cdot f.$$

Since with this filling velocity, the filling level echo would only move by 0.64 mm from envelope curve to envelope curve, it would be possible here to use a major time interval for tracking the echo. Thus, it would certainly be sufficient to store envelope curves in the present example, for instance, only at an interval of 6.4 cm, whereby the maximum number z of columns would be reduced to 78.

Since after a one-time run of the method according to the invention, the filling velocity inter alia is known as a result, the array size may therewith be determined. It is true that such an adaptation of the array size is desirable, since it allows memory space and computing time to be saved, but, on the other hand, it is not imperative, since with a constant array size, equally good results may be obtained when the filling processes are not unusual.

Figure 6:
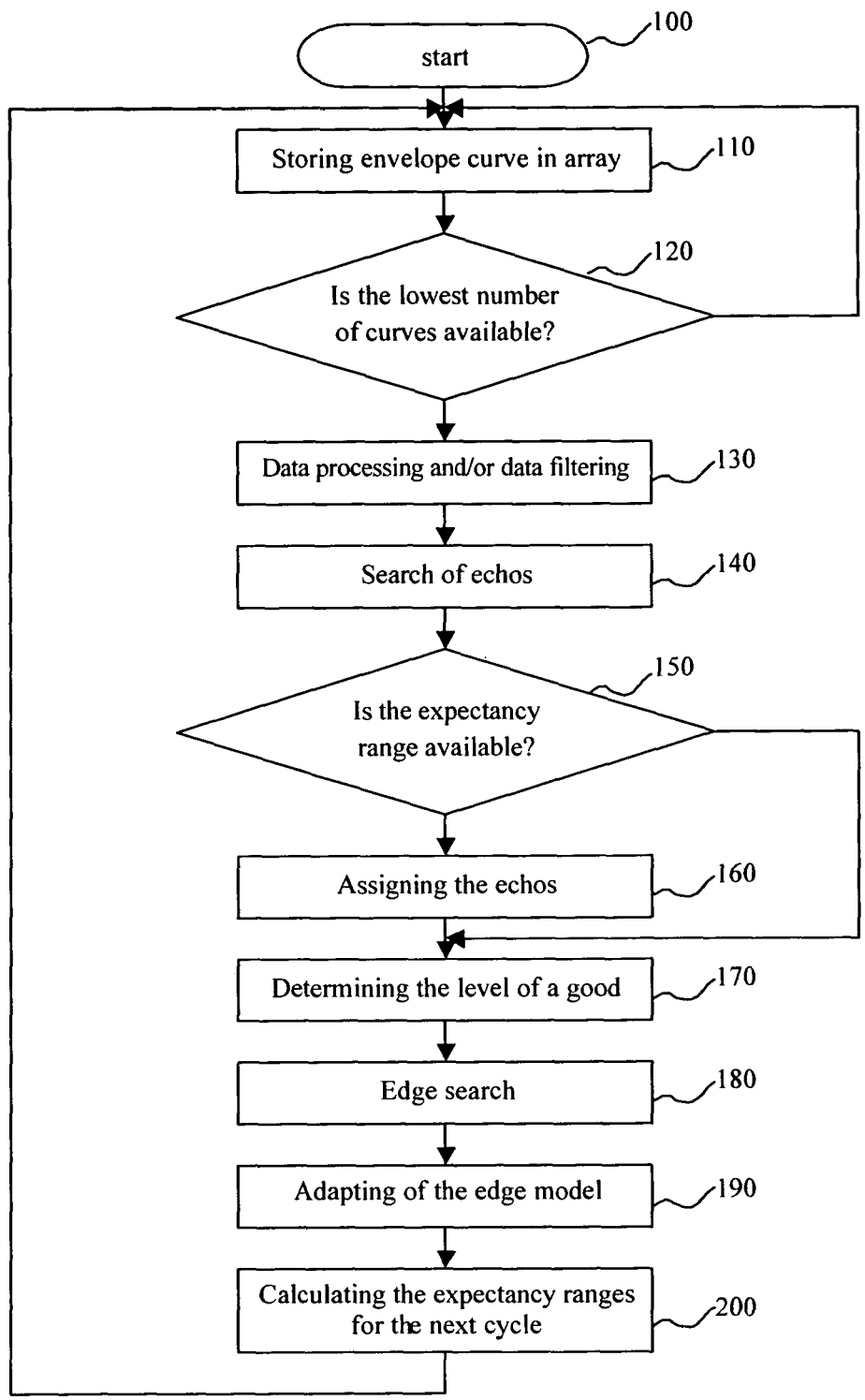
FIG. 6 a flowchart illustrating the steps for expectancy range determination.

In FIG. 6, a possible procedure for the method according to the invention is illustrated in a flowchart. After the method had been started in step 100, step 110 initiates the storage in an array of filling level envelope curves sampled by an analog-to-digital converter. This step has already been described in detail with respect to FIG. 5. In the next process step 120, the decision is made by means of a logic inquiry whether the array is already completely written-in with past echo data. If this is not the case, then step 110 is carried out in a loop until the array is filled with filling level envelope curves.

Once the array is completely written-in with z filling level envelope curves, the next process step initiates a filtering out of undesired signal portions such as noise, whereby a reduction of the data amount to be processed can be achieved. This filtering takes place by means of image processing methods known per se.

In the case that, as has already been described at the beginning, the expectancy range determination is performed as early as after each $n^{th}$ ($n \in \mathbb{IN}^*$, $n < z$) newly recorded filling level envelope curve, restoring of the filling level envelope curves filed in the array or of the corresponding echo data additionally becomes necessary in step 110. This can, for example, be achieved in that the eldest n filling level envelope curves are erased, the remaining z-n filling level envelope curves are shifted by n columns, and the thus emptied n columns are filled in a loop in step 110 until the array is completely occupied again by filling level envelope curves.

In the FIGS. 7 and 8, the image processing algorithm described in step 130 is illustrated numerically. FIG. 7 hereby is an exemplary detail of the array that had been filled with filling level envelope curves in step 110. As can be seen here, the echo having the amplitude 25 changes its location depending on time. In step 130, the parameters of each echo are determined with image processing methods such as selection. In FIG. 7, for example, in each echo of the filling level envelope curve, the number of location units between the two numbers "9" are supposed to be the echo width. Also, the beginning as well as the end of the echo is determined through these two numbers. The maximum value is filtered out of each echo with an algorithm for maximum determination (see also step 140). In FIG. 7, this maximum value in the series of envelope curves in each case results at 25. The parameters thus found are stored independently of the array so that only the array shown in FIG. 8 is left, in which just the maximum values are marked with numbers. The array illustrated in FIG. 8 then is further processed in step 180.

In step 140, each single filling level envelope curve is checked for maximum values, hence for amplitudes of the individual echoes. For this purpose, other known methods of image processing are employed, such as, for example, an algorithm for maximum search. The echoes thus detected thereby are quantified more precisely by their associated parameters, such as, for example, location, amplitude, beginning and end.

An inquiry takes place in step 150 whether expectancy ranges had already been determined in the past to which the echoes detected in step 140 can be assigned. If expectancy ranges are not yet available, then step 160 must be skipped, and the filling level must be determined in step 170 without past information. Then, for example, the echo having the largest amplitude may be referred to for determining the filling level.

If, however, expectancy ranges had been determined for the current time window, then the echoes previously detected in step 140 are assigned to the expectancy ranges and the therewith associated past echoes by means of their parameters. This assignment to the expectancy ranges takes place in step 160. If an echo can be assigned to an expectancy range in this step, then it may be assumed with a predeterminable probability that this echo has not been erroneously assigned to this expectancy range. If the expectancy range, for example, was assigned a range width of the six-fold standard deviation of the echoes in the last time window, then it may be assumed in the current time window with a probability of 99.7% that an echo that has been assigned to the expectancy range, has not been assigned erroneously to this range, and in step 170, the filling level can be determined.

If, in the current time window, individual echoes cannot be assigned to an expectancy range, then these must not be taken into account for considering the expectancy ranges for the next future time window, and must be rejected. It is likewise possible that an echo cannot be assigned to the expectancy range of a filling level. Here, it is, for example, possible that the echo has disappeared, e.g. due to a beginning filling process. In this case, the location and time of the loss of the filling level echo should be stored so as to be able to take this into account in the determination of the future expectancy range.

Subsequently, in steps 180, 190 and 200, the expectancy ranges for the next future time window are calculated. For this purpose, the progressions of the echoes in the array are first identified with the aid of an edge detection algorithm in step 180, i.e. amplitudes correlating to a certain echo are searched.

In FIGS. 9 and 10, a method possible for this purpose is exemplified. The arrays represented there correspond to an exemplary detail of a filling level envelope curve array according to FIG. 8 with the dimensions location, time and amplitude. If one starts now in FIG. 9 from the first line in the first column and goes downwards, one reaches the first echo in the second line. This echo is given number 1, and this number is entered in the corresponding cell of the array shown in FIG. 10. From this starting point, the nearest surrounding is subsequently analyzed point-wise so as to reach the column and the line having the highest neighborhood value. This neighborhood value is given the corresponding number, in the present case number 1, which again is entered in the corresponding cell of the array shown in FIG. 10. This procedure is continued until the end of the array is reached or until the "track" of the echo is lost. Thereafter, a start value for the next echo is searched and the method is continued accordingly. With this method, one finally obtains the array shown in FIG. 10, in which the progressions of the two echoes of FIG. 9 are set off by their numbers. In this manner, the edges belonging to each echo are identified.

From the edge forms thus detected, equations may be determined in step 190 by appropriate curve approximation methods such as polynomial interpolation, spline interpolation, regression analysis or correlation analysis, which approximate the edge forms detected in step 180. With a regression calculation, for example, the parameters of a straight line or of a polynomial are determined, which approximate the form of the edges. In the case that the respective time windows, however, do not exceed a certain size, and the cycle time of the single filling level envelope curves has not been selected too long, an approximation of the edge forms may be judged as being sufficiently good in a first approximation by a linear regression.

Applied to the edge form referenced number 1 of the array shown in FIG. 10, hence ensues a straight line as follows:

When the columns of the array in FIG. 3b are marked with x and the associated lines with y, then the parameters a, b of the straight line $$y = a \cdot x + b$$

result in $$b = \frac{\sum y_i \cdot \sum x_i^2 - \sum x_i \cdot \sum x_i y_i}{n \cdot \sum x_i^2 - (\sum x_i)^2}$$

$$a = \frac{n \cdot \sum x_i y_i - \sum y_i \cdot \sum x_i}{n \cdot \sum x_i^2 - (\sum x_i)^2}$$

Applied to the echo referenced number 1 of the array shown in FIG. 10 follows:

$$\Sigma y_i = 7+7+6+5+6+5+4+5 = 45$$

$$\Sigma x_i^2 = 1+4+9+16+25+36+49+64 = 204$$

$$\Sigma x_i = 1+2+3+4+5+6+7+8 = 36$$

$$\Sigma x_i y_i = 7 \cdot 1 + 7 \cdot 2 + 6 \cdot 3 + 5 \cdot 4 + 6 \cdot 5 + 5 \cdot 6 + 4 \cdot 7 + 5 \cdot 8 = 187$$

hence follows:

$$b = \frac{45 \cdot 204 - 36 \cdot 187}{8 \cdot 204 - 36 \cdot 36} \approx 7$$

$$a = \frac{8 \cdot 187 - 45 \cdot 36}{8 \cdot 204 - 36 \cdot 36} \approx -0.4$$

Hence follows the equation of the straight line as $$y = -0.4 \cdot x + 7.$$

The gradient of the straight line thus calculated, in case the echo referenced number 1 is the filling level echo, corresponds to the filling velocity. As has already been described, an adaptation of the array size for the next time window can be carried out with this value.

If one assumes that the variances of the actual progression are statistically distributed around the tendency represented by the detected straight line, then certain distribution parameters are determined from these variances according to step 200. Essentially, it may be assumed that the echoes are normally distributed around the tendency represented by the determined straight line. Any other distribution function, however, may be taken as a basis for calculating certain distribution parameters, such as, for example, exponential distribution, lognormal distribution, Weibull distribution or gamma distribution. In the present case, however, one proceeds form a normal distribution of the individual echoes.

From the straight line thus approximated and the actual values, an estimation value for the variance $\sigma^2$ or the standard deviation $\sigma$ can be calculated:

$$\sigma^2 \approx \frac{1}{n-1} \cdot \sum (y_i - a \cdot x_i + b)^2$$

Hence, in the present case $$\sigma^2 \approx \frac{1}{7} \cdot \begin{pmatrix} (7-6.6)^2 + (7-6.2)^2 + (6-5.8)^2 + (5-5.4)^2 + \\ (6-5)^2 + (5-4.6)^2 + (4-4.2)^2 + (5-3.8)^2 \end{pmatrix} =$$

$$0.429$$

So as to be able to make a statement with a 99.7% probability on how certain an echo that falls into an expectancy range has not been erroneously assigned to same, a value of 3σ must be admitted on both sides around the straight line representing the tendency. Hence follows for the straight line delimiting the expectancy range $$y_{upperlimit} = a \cdot x + b + 3\sigma = -0,4x + 8.96, \text{ and}$$

$$y_{lowerlimit} = a \cdot x + b - 3\sigma = -0,4x + 5.03.$$

When only one echo in the next time window is within this expectancy range, then this echo, with a probability of 99.7%, is the same as in the past cycles so that the method, in step 110, may be carried out again with this echo thus detected.

Figure 11:
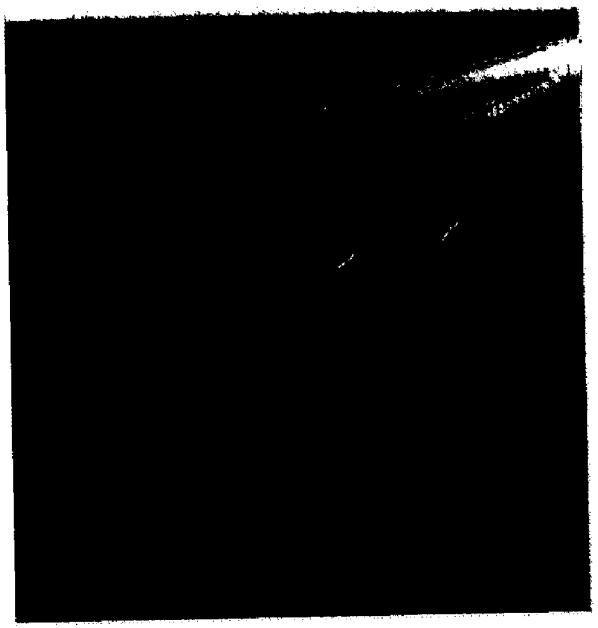
FIG. 11 a gray scale value image of an array with echo data.
Figure 12:
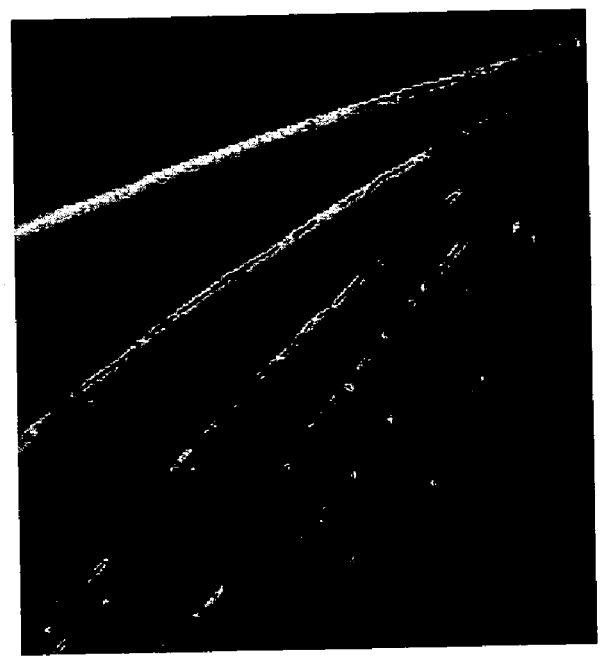
FIG. 12 a gray scale value image of the array of FIG. 11 after application of image processing methods.

FIGS. 11 and 12 illustrate gray scale value images of the array in which the filling level envelope curves are stored FIG. 11 shows the echoes of the filling level envelope curves prior to processing as bright, however, relatively wide ranges. FIG. 12 essentially shows the echoes of the same filling level envelope curves as in FIG. 11, but the representation of FIG. 12 differs from that of FIG. 11 in that, thanks to the image processing methods, such as, for example, edge filtering, the human eye can perceive the gray scale value image as being substantially clearer and sharper. Such a visualized representation of the filling level envelope curves or of the arrays as a gray scale value image, for example, may be useful to an operator for recognizing whether the algorithm according to the invention functions correctly, and if not, in which manner he has to intervene. With the aid of these gray scale value images, for instance, he can decide whether the current array size probably has been chosen too small, or whether the cycle times must be adapted from filling level envelope curve to filling level envelope curve.

Figure 13:
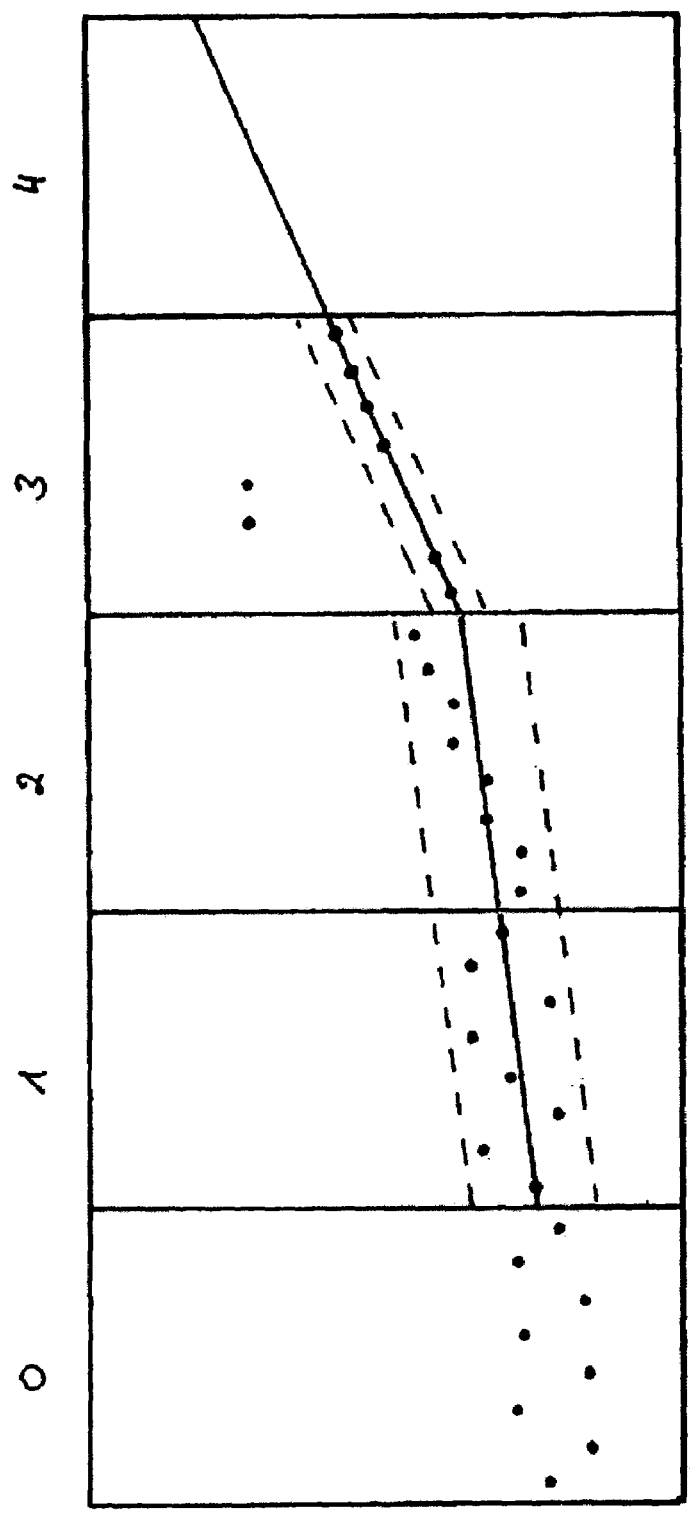
FIG. 13 in a graphic representation, several arrays successively staggered in a chronological order with prognosticated expectancy ranges for the future.

In FIG. 13, the method of the invention is described again. Each time window shown there comprises eight echoes, with a new expectancy range for the following eight echoes being calculated after each eighth echo. In FIG. 13, five chronologically successive time windows are illustrated. If one assumes that the time window 0 lies in the past, then the expectancy range shown in dashed lines in time window 1 may be determined from the echoes from time window 0. The expectancy range of time window 1 follows, in that in time window 0 the straight compensation line is calculated first, by which the echoes visible there may be approximated. This straight approximation line corresponds to the full line in time window 1. Subsequently, the standard deviation is calculated from the deviations of the echoes in time window 0 with respect to this straight line. Using this standard deviation, the width of the expectancy range is determined in time window 1 on both sides of the calculated straight tendency line. If this width on both sides of the tendency line in time window 1 is, for example, the triple of the standard deviation σ, then a statement with a 99.7% probability can be made for time window 1 whether the echoes that are represented here and fall into this expectancy range, correspond to the echoes from time window 0.

Since in the present case, it may be assumed that all echoes in time window 1 falling into the expectancy range, actually may be assigned to same, the straight tendency line for time window 2, as well as the surrounding expectancy range can be determined from these echoes in an analogous manner. In time window 2, all echoes are again within the dashed expectancy range. Here again, it may hence be assumed that all of the echoes actually belong to this echo series so that the tendency line for the third time window, as well as the surrounding expectancy range may in turn be calculated from these echoes. However, if the compensation line in time window 2 is drawn through the individual echoes, then a steeper ascending tendency line ensues for time window 3 as compared to the gradient of the expectancy range of time window 2. Since in addition the single echo data in time window 2 scatter less about the compensation line, the width of the expectancy range for time window 3 hence narrows down, as well.

It can be seen in time window 3 that the third and the fourth echo is outside of the prognosticated expectancy range. The remaining echoes, however, lie exactly on the tendency line of the third time window. For forecasting the fourth time window, the third and the fourth echoes may hence not be taken into account, since these lie outside of the expectancy range of time window 3 and would otherwise erroneously affect the expectancy range of time window 4 so that same would increase steeper than it is shown. Since in time window 3 the remaining echoes lie exactly on the tendency line, the expectancy range for time window 4 is reduced to the tendency line itself. This, however, rather is an academic approach, which normally would not be found in practice.

The invention claimed is:

1. A method of determining at least one expectancy range for a filling level echo or a false echo generated by an ultrasonic or radar filling level measurement device, comprising the following process steps:
   identifying at least one filling level echo or false echo from a first filling level envelope curve, the first filling level envelope curve having been generated at a first time;
   identifying at least one second filling level echo or false echo from a second filling level envelope curve, the second filling level envelope curve having been generated at a second time different from the first time;
   determining at least one expectancy range for a filling level echo or false echo in consideration of the temporal behavior of the identified at least one first filling level echo or false echo and of the identified at least second filling level echo or false echo;
   sampling a filling level envelope curve currently received by the filling level measurement device by an analog-to-digital converter;
   storing the echoes of the sampled filling level envelope curve including their echo data in an array of a predeterminable size;
   processing the echo data stored in the array with image processing methods;
   searching individual echoes in the current filling level envelope curve;
   assigning the detected echoes to expectancy ranges determined in the past for a filling level echo or a false echo;
   in the case that an echo is assigned to the expectancy range for the filling level, determining the filling level using said echo; and
   when the array is occupied by echo data, determining a new expectancy range for echoes to be expected in the future.

2. The method according to claim 1, wherein the method further comprises: identifying at least one further filling level echo or false echo from at least one further filling level envelope curve, said further filling level envelope curve having been generated at a further time different from the first time and the second time.

3. The method according to claim 1, wherein the at least one expectancy range is cyclically determined in consideration of the temporal behavior of at least two past filling level echoes or false echoes.

4. The method according to claim 1, wherein after each filling level envelope curve newly received by the filling level measurement device, a new expectancy range is determined.

5. The method according to claim 1, wherein after n filling level envelope curves newly received by the filling level measurement device, a new expectancy range is determined, whereby applies n∈IN*.

6. The method according to claim 1, wherein, when the array is occupied by echo data, the expectancy ranges for the filling level and the false echo are determined in consideration of the echo data stored in the array in the past and representing the filling level envelope curves, which echo data could have been assigned to a past expectancy range.

7. The method according to claim 1, wherein the echo data is stored in the array including the dimensions location, time and amplitude.

8. The method according to claim 1, wherein the expectancy ranges are determined in that the echo data that could have been assigned to a past expectancy range, are approximated with a functional progression, and a deviation measure is determined as compared to said functional progression thus determined, from which a range width may be established for the expectancy range to be determined.

9. The method according to claim 8, wherein the functional progression is determined by means of a regression method, a polynomial interpolation method or an approximation method.

10. The method according to claim 8, wherein as the deviation measure, a multiple of the standard deviation of the echo data is determined as compared to the functional progression.

11. The method according to claim 10, wherein it is established by said multiple of the standard deviation with which probability an echo present in a future expectancy range may actually be assigned to this expectancy range.

12. The method according to claim 10, wherein from the gradient of the functional progression for the expectancy range of the filling level echo, the current change of the filling level is determined.

13. The method according to claim 12, wherein the size of the array in which the currently received filling level envelope curves are stored, is adapted to the current change of the filling level.

14. An evaluator for determining at least one expectancy range for a filling level echo or a false echo generated by a filling level measurement device, wherein the evaluator comprises:
  means for identifying at least one filling level echo or false echo from a first filling level envelope curve, the first filling level envelope curve having been generated at a first time;
  means for identifying at least one second filling level echo or false echo from a second filling level envelope curve, the second filling level envelope curve having been generated at a second time different from the first time;
  means for determining at least one expectancy range for a filling level echo or false echo in consideration of the temporal behavior of the identified at least one first filling level echo or false echo and of the identified at least second filling level echo or false echo;
  means for sampling a filling level envelope curve currently received by the filling level measurement device by an analog-to-digital converter;
  means for storing the echoes of the sampled filling level envelope curve including their echo data in an array of a predeterminable size;
  means for processing the echo data stored in the array with image processing methods;
  means for searching individual echoes in the current filling level envelope curve;
  means for assigning the detected echoes to expectancy ranges determined in the past for a filling level echo or a false echo;
  means for determining the filling level using said echo in the case that an echo is assigned to the expectancy range for the filling level; and
  means for determining a new expectancy range for echoes to be expected in the future when the array is occupied by echo data.

15. The evaluator according to claim 14, wherein the at least one expectancy range is cyclically determined in consideration of the temporal behavior of at least two past filling level echoes or false echoes which could have been assigned to past expectancy range.

16. The evaluator according to claim 14, further comprising a memory, in which each currently received filling level envelope curve is stored after an analog-to-digital conversion with its echo data including the dimensions location, time and amplitude in an array of a predeterminable size.

17. The evaluator according to claim 16, further comprising an image processing unit processing the echo data of the filling level envelope curves stored in the array and searching individual echoes present therein.

18. The evaluator according to claim 16, wherein the means for determining at least one expectancy range is configured so as to determine the expectancy ranges for the filling level and the false echo in consideration of the echo data representative of the filling level envelope curves and stored in the array in the past, which echo data could have been assigned to an expectancy range.

19. The evaluator according to claim 18, further comprising a signal processing unit determining the expectancy ranges in that said processing unit approximates echo data with a functional progression, which echo data has been assigned to a past expectancy range, and determines a deviation measure of the echo data as compared to the functional progression thus determined.

20. The evaluator according to claim 19, wherein the signal processing unit determines the functional progression by means of a regression method, a polynomial interpolation method or an approximation method.

21. The evaluator according to claim 19, wherein the signal processing unit determines a multiple of the standard deviation of the echo data as compared to the functional progression, as the deviation measure.

22. The evaluator according to claim 19, wherein the size of the array that is stored in the memory of the evaluation unit, and in which the currently received filling level envelope curves are stored, may be dynamically adapted to the current change of the filling level, which change is represented by the gradient of the functional progression.

23. The evaluator according to claim 14, wherein the the recited means are integrated in a filling level measurement device.

24. The evaluator according to claim 14, wherein the the recited means are spaced from a filling level measurement device, and are in connection with the filling level measurement device via a data link.

25. A computer program for determining at least one expectancy range for a filling level echo or a false echo generated by an ultrasonic or radar filling level measurement device, with the computer program including instructions for performing the following operation:

identifying at least one filling level echo or false echo from a first filling level envelope curve, the first filling level envelope curve having been generated at a first time;

identifying at least one second filling level echo or false echo from a second filling level envelope curve, the second filling level envelope curve having been generated at a second time different from the first time;

determining at least one expectancy range for a filling level echo or false echo in consideration of the temporal behavior of the identified at least one first filling level echo or false echo and of the identified at least second filling level echo or false echo;

sampling a filling level envelope curve currently received by the filling level measurement device by an analog-to-digital converter;

storing the echoes of the sampled filling level envelope curve including their echo data in an array of a predeterminable size;

processing the echo data stored in the array with image processing methods;

searching individual echoes in the current filling level envelope curve;

assigning the detected echoes to expectancy ranges determined in the past for a filling level echo or a false echo;

in the case that an echo is assigned to the expectancy range for the filling level, determining the filling level using said echo; and when the array is occupied by echo data, determining a new expectancy range for echoes to be expected in the future.

26. A computer readable medium adapted to be directly loadable into the memory of a computer and including instructions for carrying out the following process steps:

identifying at least one filling level echo or false echo from a first filling level envelope curve, the first filling level envelope curve having been generated at a first time;

identifying at least one second filling level echo or false echo from a second filling level envelope curve, the second filling level envelope curve having been generated at a second time different from the first time;

determining at least one expectancy range for a filling level echo or false echo in consideration of the temporal behavior of the identified at least one first filling level echo or false echo and of the identified at least second filling level echo or false echo;

sampling a filling level envelope curve currently received by the filling level measurement device by an analog-to-digital converter;

storing the echoes of the sampled filling level envelope curve including their echo data in an array of a predeterminable size;

processing the echo data stored in the array with image processing methods;

searching individual echoes in the current filling level envelope curve;

assigning the detected echoes to expectancy ranges determined in the past for a filling level echo or a false echo;

in the case that an echo is assigned to the expectancy range for the filling level, determining the filling level using said echo; and when the array is occupied by echo data, determining a new expectancy range for echoes to be expected in the future.

\* \* \* \* \*